United States Patent [19]

Barho et al.

[11] Patent Number: 4,550,704
[45] Date of Patent: Nov. 5, 1985

[54] MULTI-CYLINDER INTERNAL COMBUSTION ENGINE HAVING DISCONNECTABLE GROUPS OF CYLINDERS

[75] Inventors: Hans Barho; Helmut Denz, both of Stuttgart, Fed. Rep. of Germany

[73] Assignee: Robert Bosch GmbH, Stuttgart, Fed. Rep. of Germany

[21] Appl. No.: 590,879

[22] Filed: Mar. 19, 1984

[30] Foreign Application Priority Data

Apr. 12, 1983 [DE] Fed. Rep. of Germany ....... 3313038

[51] Int. Cl.⁴ .............................................. F02D 17/02
[52] U.S. Cl. .................... 123/481; 123/198 F
[58] Field of Search .................... 123/198 F, 481, 339

[56] References Cited

U.S. PATENT DOCUMENTS

| | | |
|---|---|---|
| 4,098,252 | 7/1978 | Abthoff et al. |
| 4,144,864 | 3/1979 | Kato et al. |
| 4,335,687 | 6/1982 | Sugasawa et al. |
| 4,385,600 | 5/1983 | Sugasawa et al. ............... 123/481 X |
| 4,398,520 | 8/1983 | Schulz et al. ......... 123/481 |
| 4,444,168 | 4/1984 | Matsumura et al. ................. 123/339 |
| 4,462,351 | 7/1984 | Fujii et al. ...................... 123/481 X |
| 4,469,071 | 9/1984 | Bassi et al. ........................ 123/481 |

FOREIGN PATENT DOCUMENTS

| | | |
|---|---|---|
| 2930487 | 3/1981 | Fed. Rep. of Germany ...... 123/481 |
| 2942851 | 5/1981 | Fed. Rep. of Germany . |
| 40124 | 4/1978 | Japan ............................... 123/198 F |
| 55232 | 5/1979 | Japan ................................ 123/198 F |
| 133222 | 10/1979 | Japan ................................ 123/198 F |
| 2063999 | 6/1981 | United Kingdom . |

*Primary Examiner*—Tony M. Argenbright
*Attorney, Agent, or Firm*—Michael J. Striker

[57] ABSTRACT

Disclosed is a multi-cylinder internal combustion engine in which a group of cylinders is disconnectable in dependence on one or more operational parameters of the engine. The connection or disconnection of the groups of cylinders occurs in response to an engine load variation, to an acceleration signal or to a deceleration signal and to the engine temperature. The switchover takes place within a predetermined time interval. During the switchover of the cylinder groups, the ignition angle and if desired the volumetric efficiency are controlled. When only a part of the cylinders of the engine is in operation after a predetermined number of engine rotations the active cylinders are disconnected and simultaneously the inactive cylinders are connected into operation. During the switchover process any unintentional switchover is prevented by a signal blocking device. A stabilization of idling speed of the engine is selectively made by connecting into operation a group of cylinders or by an auxiliary air flow device. The switchover of cylinder groups during a partial load operation is influenced by switching devices having hysteresis behavior, which also enhances the stabilization during idling operation. The engine of this invention is preferably used in all kinds of motor vehicles.

21 Claims, 18 Drawing Figures

MULTI-CYLINDER INTERNAL COMBUSTION ENGINE HAVING DISCONNECTABLE GROUPS OF CYLINDERS

BACKGROUND OF THE INVENTION

This invention relates in general to multicylinder internal combustion engines for motor vehicles in which at least one group of cylinders is rendered inactive in response to at least one operational parameter of the engine.

From the German publication DE-OS No. 2,942,851 a device for disconnecting at least one cylinder in a multi-cylinder internal combustion engine in dependence on at least one operational parameter is known. In this prior-art device an electrical regulator is provided for controlling rate speed of the vehicle, so that after the connection or disconnection of the cylinders a corrective motion of throttle valves is performed. By means of this measure a power jump during the cylinder changeover is to be compensated for. A similar device is known from the German published patent application DE-AS No. 2,947,688, in which also the throttling valve acting as the regulating member executes a sudden or jerky movement during the cylinder changeover. The magnitude of this jump of the throttle valve is made dependent on the rotary speed of the machine, in such a manner that the load and torque of the machine during the connection or disconnection of the cylinders remains unchanged.

The sudden angular change of the position of the throttle for the purpose of preserving the power of the internal combustion engine during the connection or disconnection of the cylinders is known also from the German publication DE-OS No. 2,612,172.

The latter publication employs for this purpose a special linkage; on the other hand, the aforementioned two publications disclose electronic control devices.

One of the disadvantages of the prior-art devices is a one-sided wear of a certain cylinder or cylinder groups; another disadvantage of prior-art solutions is the necessity of warming up the cylinder or cylinder groups after their switchover.

Individual problems have been also approached in the German publications DE-OS Nos. 2,724,487 and 3,023,180. In the prior-art multi-cylinder internal combustion engine according to the publication No. 2,724,487, there is provided a device having a variable threshold value which is derived from the rotary speed of the engine and made dependent on the engine load. When the load during the run of the engine drops below or rises above the variable threshold value, the fuel supply for a part of the cylinders is interrupted or changed over. In the internal combustion engine known from the German publication No. 3,023,180, starting performance and warm running quality of the engine is improved in such a manner that the warm running is always performed with the full number of cylinders. However, when the engine is warmed up, then during its unloaded operation a part of the cylinder is disconnected. However, even these two last mentioned publications do not solve the problem of the one-sided wear of some of the cylinders and do not consider the cooling down of the unused cylinders. Similarly, in the engine according to the publication No. 3,023,180, the full number of the cylinders is switched over when the total temperature of the engine drops below a certain value.

SUMMARY OF THE INVENTION

A general object of the present invention is to provide a multi-cylinder internal combustion engine of the afore-described kind which has the advantage that, during the operation of the engine with only a part of its cylinders, the operative cylinders can be alternately activated. As a consequence, all cylinders of the engine are subject to a uniform average wear, on the one hand, and, on the other hand, the cylinders which are not momentarily employed for driving purposes are kept warm. Due to the last-mentioned feature, any switching jerk or jump occurring during the connection of a further group of cylinders is substantially reduced, and moreover a substantial saving of fuel is achieved.

In keeping with these objects and others which will become apparent hereafter, one feature of the invention resides, in a combustion engine having a plurality of cylinders of which at least one group can be made ineffective in response to at least one operational paramter of the engine, in a combination which comprises electrically controlled disconnecting means for switching off said group of cylinders from operation; monitoring means including an engine load measuring device and a rotary speed measuring device for producing a cylinder control signal when a predetermined value of the monitored parameter is detected; engine control means cooperating with said plurality of cylinders and said disconnecting means and including an igntion angle adjuster, a fuel dosing device and a changeover device, said changeover device being connected in series with said disconnecting means for selecting cylinders to be switched off in response to said cylinder control signal.

According to a further elaboration of this invention, the alternation of individual cylinder groups does not occur in dependence on time, but is dependent on a predetermined number of rotations of the engine. Preferably, the alternation or changeover is performed at the moment when a load changeover takes place.

In a preferred embodiment of this invention, two switchover threshold are provided, of which one depends on the switching on or switching off of further groups of cylinders so as to permit a more accurate control of the switchover conditions and to provide for a hysteresis which contributes to the quietness of the driving behavior of the vehicle. An additional driving comfort is produced by suppressing switching signals which may occur during the current switching process, so as to avoid an unintentional switchover during this interval.

According to another feature of this invention, there are provided function generators which ensure that the cylinder group or groups which are being switched on are controlled by control signals for fuel dosing, air metering and ignition angle adjustment of such a value which ensures an optimum fuel consumption and/or exhaust gas behavior, and that the switching processes are performed without any perceivable jump. Preferably the switchover is made at the instant when the full load switch or idling switch are closed.

The idling stabilization is also effectively improved in accordance with additional features of this invention. By using a single air meter only, the measured amount of the idling air is doubled in comparison with conventional engines, and consequently the corresponding amount of fuel can be metered more accurately. By reducing the range of variation of the amount of air, an air meter of simpler construction can be used. Finally, the accuracy of the control device is also increased, inasmuch as the amount of air is determined with a higher revolution.

A further improvement of the efficiency of the engine is achieved by the provision of auxiliary air during the switchover of the cylinders or cylinder groups, and by a suitable control of the amount of this auxiliary air. By means of the auxiliary air control, the torque of the engine during the switchover processes can be extended in time without consumption losses, and consequently they become undiscernible to the operator of the vehicle. The so-called "patching" occurring during the connection of the second cylinder group in reducing the torque of the engine due to the retardation of the ignition angle, does not occur any more. Finally, by virtue of the control of the auxiliary air, a simpler program flow is achievable for the control device.

Further advantages of this invention result also from the release of the changeover process during the partial load and due to the releasing signal produced by a load variation, as well as by an acceleration or deceleration signal, due to the two different load thresholds, depending on the rotary speed of the engine during the switchover at a partial load and the hysteresis switchover for stabilizing the idling operation, the control of the ignition angle, the volumetric efficiency and the amount of air.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
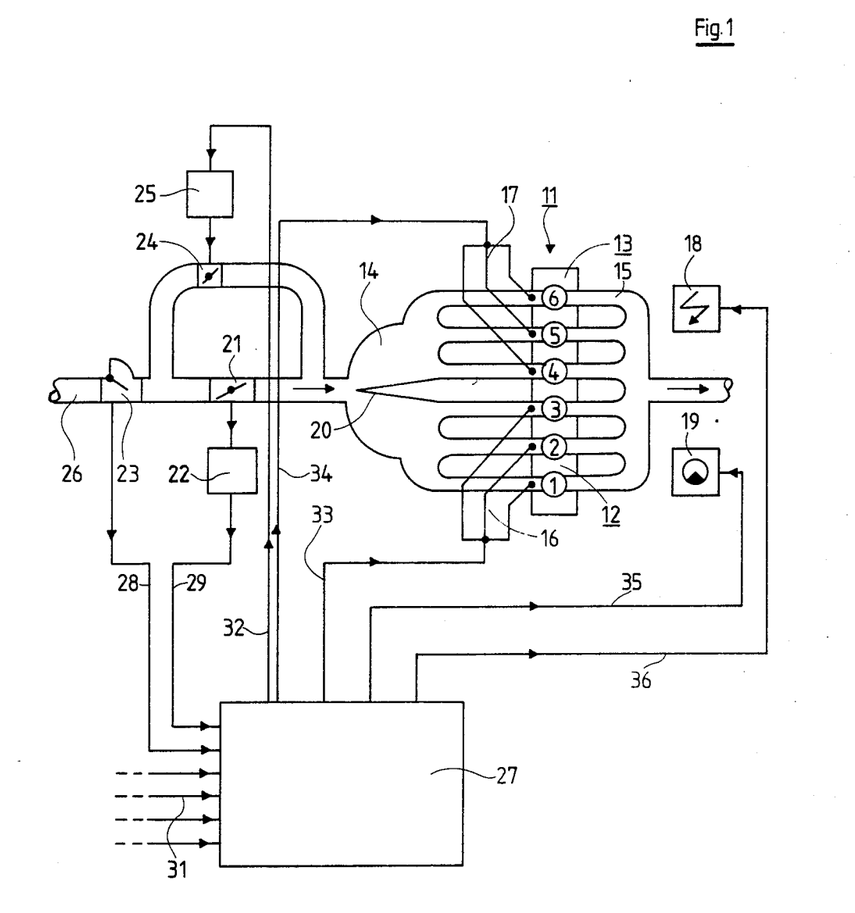
FIG. 1 is a schematic representation of a multi-cylinder internal combustion engine having switchover means for selecting groups of cylinders.

Referring to FIG. 1 showing general schematic illustration of a multi-cylinder internal combustion engine having groups of disconnectable cylinders, a cylinder block 11 includes a first group 12 of cylinders which in this example consists of cylinders 1, 2 and 3 and a second group 13 of cylinders 4, 5 and 6. The motor block 11 is provided with an intake region 14 and an exhaust region 15. The intake region is preferably divided by a partition 20 into two zones assigned to respective groups 12 and 13 of cylinders, to prevent or reduce the suction of fed-in fuel mixture by the disconnected cylinders and supply the fuel to the operative group of cylinders only. There is also provided a corresponding number of fuel injection valves arranged in two groups 16 and 17. The motor block 11 also is provided in conventional manner with ignition devices 18 inclusive of ignition coils and a fuel supply pump 19. A throttle valve 21 cooperating with a throttle valve position sensor 22 is arranged in conventional manner upstream of the intake region 14. An air inflow meter 23 is provided before the throttle valve 21. In the embodiment according to FIG. 1, the series connection of air flow meter 23 and throttle valve 21 also includes an auxiliary air control device 24 coupled with an idling speed adjuster 25 and bridging the throttle valve 21. The inlet of the air flow meter 23 communicates with the intake conduit 26 for the air.

For controlling the multi-cylinder engine of this invention there is provided an electronic control device 27 having a plurality of inputs and outputs. The inputs of the control device 27 are connected via conduits 28, 29 and 31 to the air flow meter 23, to the throttle valve sensor 22 and to non-illustrated other sensors monitoring the operational parameters of the engine. One output of the control device 27 is connected via conduit 32 to the idling speed adjuster 25, via conduit 33 to the first group 16 of injection valves and by conduit 34 to the second group 17 of the injection valves. Conduit 35 connects the device 27 to fuel pump 19, and conduit 36 to ignition device 18.

Figure 2:
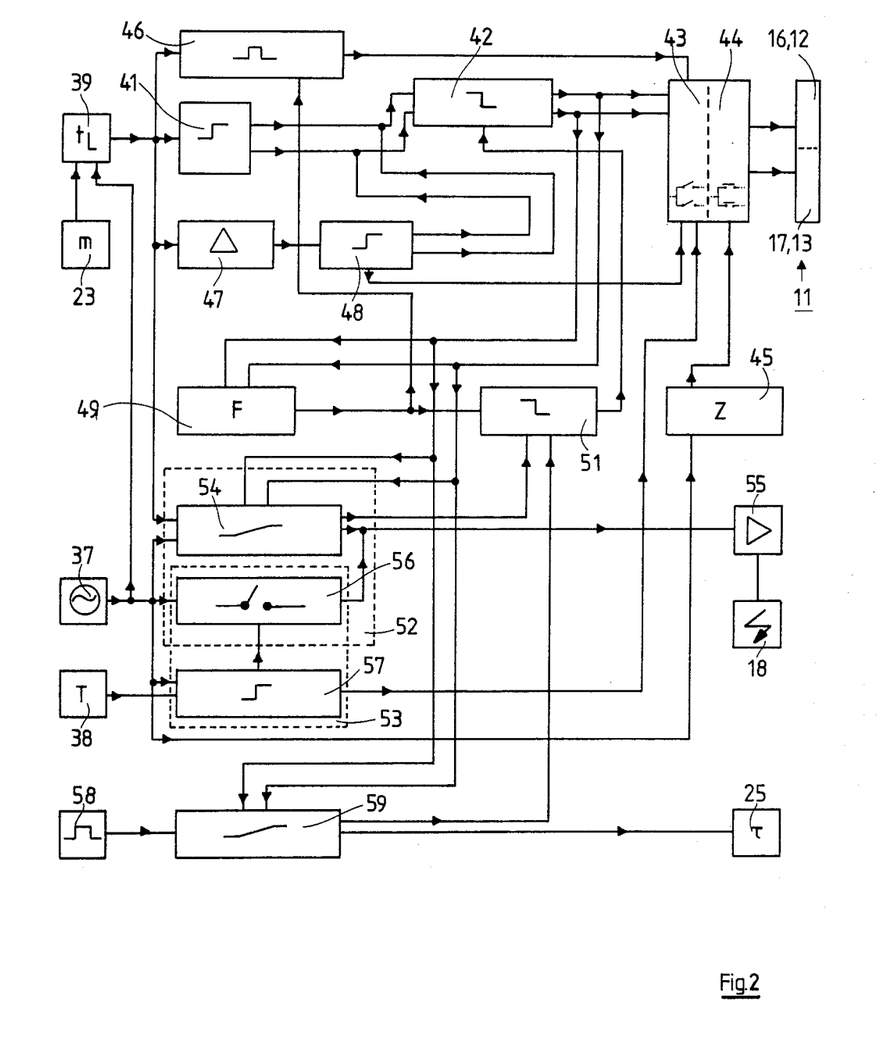
FIG. 2 is a block circuit diagram of a control device for the cylinder selection.

The control device 27 and its building blocks are illustrated in FIG. 2. In practice, many of the functional blocks of the circuit represent software rather than hardware, and their functions are realized by programming the logic control unit 27. In the diagram there are illustrated the air flow meter 23, rotary speed sensor 37 which measures the speed of the engine, and a temperature sensor 38 measuring the temperature of the engine. The engine load is measured by a device 49, one input of which is connected to the air flow meter 23 and the other input to the rotary speed sensor 37. The engine load signal from the output of the measuring device 39 is applied to an interrogating device 41 for testing or interrogating the threshold value of the incoming signal. The two outputs of the threshold interrogating device 41 are connected to corresponding inputs of a signal blocking device 42. The two outputs of the signal blocking device 42 are connected to corresponding inputs of a switching or disconnecting device 43. The disconnecting device 43 cooperates with a series-connected injection time control device 44. The output conduits of the changeover device 44 lead to the first group 16 of fuel injection valves pertaining to the first cylinder group 12, and to the second group 17 of fuel injection valves pertaining to the second cylinder group 13.

The control circuit of this invention further includes a counter 45 whose input is connected to the rotary speed sensor 37, and whose output controls the input of the injection time control device 44. A fuel dosing or metering device 36 has its input connected to the engine load measuring device 39 and its output connected to one of the inputs of the switching or disconnecting device 43. The control circuit 27 further includes a difference forming device 47 whose control input is connected to the output of the engine load measuring device 39, and whose output is connected to an acceleration interrogating device 48. The acceleration interrogator 48 has a characteristic curve corresponding to a threshold value. Two outputs of the acceleration interrogating device 48 are connected to the inputs of the signal blocking or gating device 42, and a third output of the device 48 is connected to an input of the disconnecting device 43. A factor forming device 49 has two inputs connected to the outputs of the signal blocking or gating device 42, and an output connected to an input of the fuel dosing or metering device 36. The output of the factor forming device 49 is further connected to one of the inputs of a recognition device 51. The output of the device 51 is connected to an input of the signal gating device 42.

A circuit group 52 serves for adjusting the ignition angle. Another circuit group 53 serves for stabilizing the idling speed of the engine. Both circuit groups 52, 53 include a common regulating device 56, whose operation will be explained in greater detail below.

The circuit group 52 includes a setting device 54 for adjusting the ignition angle. One input of the device 54 is connected to the engine load metering device 39 and another input of the device 54 is connected to the rotary speed measuring device 37. One of the outputs of the device 54 is connected to the recognition device 51, and another input is connected to the end stage 55 of the ignition circuit. The circuit group 53 for stabilizing idling operation includes the idling speed regulating device 56 and an idling speed switching device 57. As mentioned before, the idling speed regulating device 56 is a component part both of the circuit group 52 for adjusting the ignition angle and of the circuit group 53 for the idling speed stabilization. One input of the device 56 is connected to the rotary speed measuring device 39, and another input thereof is controlled by an output of the idling speed switching device 57. The output of the regulating device 56 is connected to the input of the end stage 65 of the ignition circuit. One of the inputs of the idling speed switching device 57 is connected also to the rotary speed measuring device 37, and the other input is connected to a temperature measuring device 38 while the output is connected to one of the inputs of the disconnecting device 43.

A function generator 59 has an input connected to the output of a conventional control signal generator 58, and an output connected to an idling speed adjuster 25. The other two inputs of the generator 59 are connected to the outputs of the signal gating device 42, and another output of the device 59 is connected to an input of the recognition device 51.

The operation of the multi-cylinder internal combustion engine of this invention will be now explained in connection with the diagrams of FIGS. 3–12.

In this multi-cylinder engine, all stationary operational conditions such as lower load, minute accelerations at the low load, as well as delays, starting from a range of increased load, take place at a three-cylinder mode of operation. Medium and strong accelerations as well as a stationary operation at an increased load take place in this example in a six-cylinder mode of operation.

In the following description, the switchover of the cylinder groups is indicated by indices. For example, the index "36" designates "switchover from a three-cylinder operation ("3") to six-cylinder operation ("6")".

For switchover from the three-cylinder operation to the six-cylinder operation, a rotary-speed-dependent threshold value $t_{L36}$ is first introduced. It will be seen in the diagram of FIG. 2 the relationship between a speed n measured in revolutions per minute and a load signal $t_L$ measured in milliseconds, is represented. The meaning of the the three threshold values $t_{Lmax}$, $t_{L36}(n)$ and $t_{L63}(n)$ will be explained below. The circuit pertaining to this diagram is the threshold value interrogating device 41 in FIG. 2. Assuming that the engine is running in the three-cylinder mode of operation and that the detected load signal $t_L$ of the machine load is below the threshold $t_{L36}$, then the three-cylinder operation will continue. If the detected $t_L$ values exceed the beforementioned threshold value, then the interrogation device 41 generates a switchover signal $S_{36}$.

Then a set of acceleration values $\Delta t_{L36}$ is introduced in dependence on the load signal $t_L$ and on the rotary speed n. This relationship is graphically represented in FIG. 4, and the corresponding circuits establishing this relationship are the difference generating device 47 and the subsequent acceleration interrogating device 48 in FIG. 2. If in the three-cylinder operation the detected load change $\Delta t_L$ between an old load and a new load is larger than a preset value $\Delta t_{L36}(n, t_L)$ stored in the program of the control device 27, then also a switchover signal $S_{36}$ is released. In this case, as will be explained below, a "soft" switchover to the six-cylinder operation takes place. Nevertheless, if the load change $\Delta t_L$ exceeds at least about a value $\Delta t_{LBmax}$ the values $\Delta t_{L36}$ of the set, then a strong acceleration will result. As a consequence, no "soft" switchover takes place, the stationary values of the ignition angle α and the injection $t_i$ are preserved, and the second cylinder group undergoes a "hard" connection. In actuating the usual full-load contact, the "hard" switchover to the six-cylinder operation takes place in similar manner.

Figure 3:
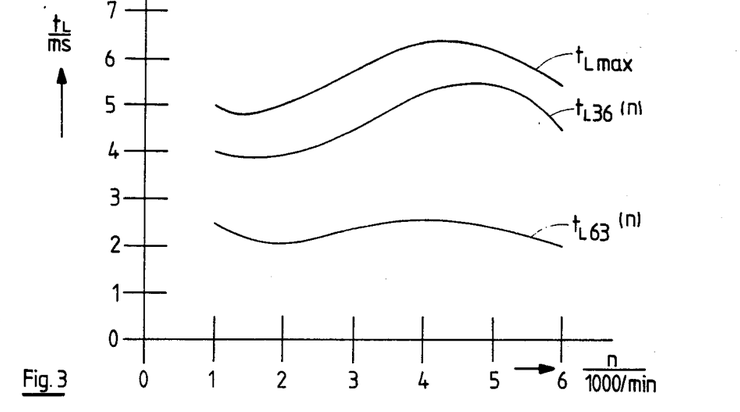
FIG. 3 is a block diagram of switchover thresholds.
Figure 4:
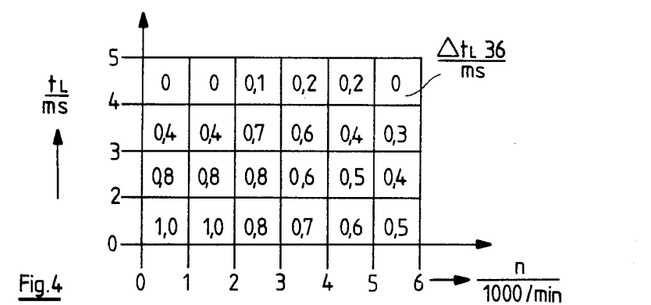
FIG. 4 is a set of acceleration data.

In a switchover from the six-cylinder operation to the three-cylinder operation, the threshold value interrogation device 41 determines whether during the six-cylinder operation with low load changes the detected $t_L$ values fall below a threshold $t_{L63}$. In the latter case, a switchover signal $S_{63}$ is released, as indicated in the diagram of FIG. 3.

Figure 5:
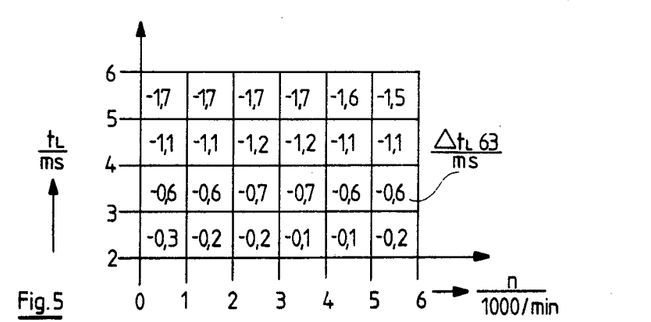
FIG. 5 is a set of retardation data.

The difference generating device 47 and the acceleration, interrogating or reading device 48 produce a set of delaying characteristics $\Delta t_{L63}(n, t_L)$, as illustrated in FIG. 5. When during the six-cylinder operation larger negative values for $\Delta t_{L63}$ occur, which are larger than the negative values contained in the set of FIG. 5, a switchover signal $S_{63}$ is generated and the engine is switched back to the three-cylinder operation.

In order to minimize the switching shock or jerk after the release of the signal $S_{36}$ during the changeover from the three-cylinder to the six-cylinder operation of the engine, there are provided measures for achieving "soft" switchover. As soon as in the three-cylinder operation the switching signal $S_{36}$ and hence the switchover condition is generated, the load signal (volumetric efficiency) $t_L$ present at this time point is regulated for the maximum torque. For this purpose, it is enriched in the stationary adjustment via a first time function and simultaneously the ignition angle is adjusted to a corresponding optimum value for ignition. These functions are performed by means of the factor generator device 49 and the ignition angle adjusting device 54.

Figure 6:
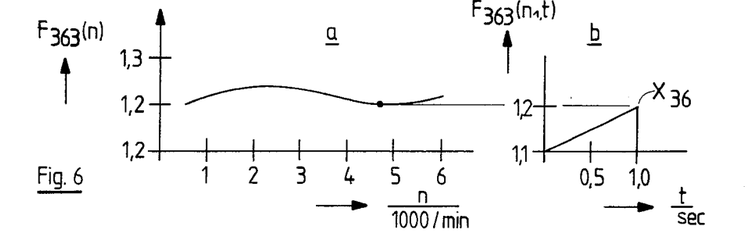
FIGS. 6a and 6b show a plot diagram of a correction factor for fuel injection time before the cylinder changeover.
Figure 7:
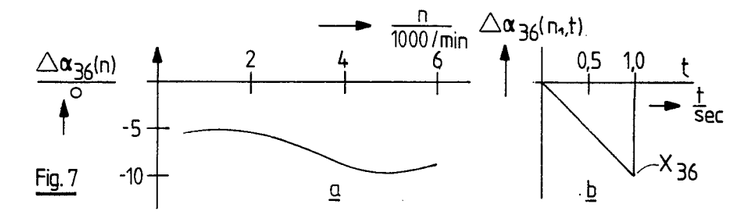
FIGS. 7a and 7b show a plot diagram of a correction angle before the switchover.

As will be seen from FIGS. 6 and 7, a correction factor $F_{363}(n)$ is formed in the factor forming device 49 (FIG. 6) and an additive correction angle $\alpha_{36}(n)$ for ignition is formed in the ignition angle adjusting device 54. The total regulating process in the device of this example lasts about one second. The pulse time determined by the fuel metering device 46 is determined substantially from the time $t_L$ given by the engine load metering device 39, by the enrichment factor $F\lambda$ derived from the set of $\lambda$ values, and by the correction factor $F_{363}(n, t)$ of FIG. 6; the ignition angle $\alpha$ delivered by the ignition angle adjusting device 54 and the end stage 55 is determined from the ignition angle value $\alpha(n, t_{l1})$ retrieved from the set of characteristic $\alpha$ values and the additive correction factor $\alpha_{36}(n, t)$ of FIG. 7.

Figure 8:
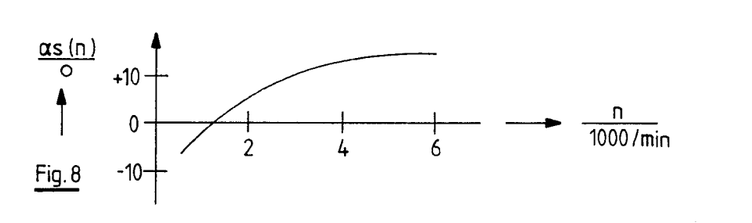
FIG. 8 illustrates the behavior of the correction angle after the switchover.
Figure 9:
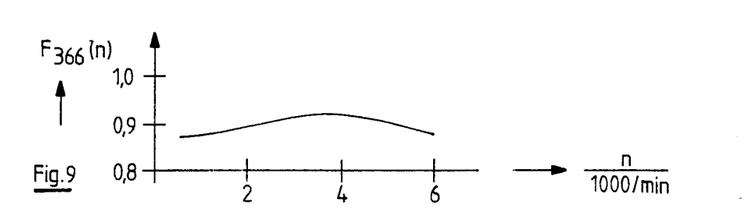
FIG. 9 is a diagram of the correction factor after the switchover.

As soon as the values pertaining to the maximum torque are achieved the second cylinder group is switched on, and at the same time the ignition angle is adjusted to a strongly retarded value, indicated graphically in FIG. 8, and switched over to a new lean-making factor $F_{366}(n)$ as illustrated in FIG. 9. After the adjustment of the ignition angle and the correction factor, the process is subsequently reset within about 2–4 seconds by a second time function in a stationary adjustment or accommodation.

In FIGS. 6 and 7a the values of the correction factor F and of the additive ignition angle $\alpha$ for different rotary speeds of the engine are plotted. In FIGS. 6b and 7b, these values are plotted against time. At the time point t=1 sec., the switching on takes place.

FIGS. 8 and 9 illustrate correction values for different rotary speeds of the engine after the switchover.

A switchover from the six-cylinder to the three-cylinder operation, after the release of the switchover signal $S_{63}$ follows similarly as in the above described switching from the three-cylinder to the six-cylinder operation, but in reversed order. First, the torque is reduced via a time function and by means of a correction factor $F_{636}(n)$ the mixture is made lead, and the ignition angle is adjusted for retardation. As soon as the values for a minimum torque are reached, the second cylinder group is switched off. Simultaneously, the operation is enriched by means of a correction factor $F_{633}(n)$ and an additive correction angle $\alpha_{63}(n)$ is applied to the ignition angle. Also these correction magnitudes are again readjusted via a time function up to the stationary adjustment or accommodation.

In order to prevent unintentional switchovers during the above described switching processes, there is provided the signal blocking or gating device 42. Unintentional reconnecting processes can occur for example due to changes of the load signal $t_L$ resulting from the changes in position of the throttling valve 21 which may be introduced by unintented reactions of the driver. By means of the signal blocking device 42 the signals causing the switchover conditions are suppressed so long until a stationary three-cylinder or six-cylinder operation is obtained. Only after the full-load switch or an idling speed switch is closed, or when as described above a full acceleration or a full delay is advanced, a direct switchover on the stationary six cylinder operation or a three-cylinder operation takes place.

For the case that the engine runs over an extended period of time in the three-cylinder mode of operation, for example if the first group 12 of cylinders while the second group 13 of cylinders remains disconnected during this time period, the second group of cylinders normally cools down particularly due to the fact that fresh air is pumped therethrough. If in a new mode of operation with six cylinders the second group is reconnected, it must be warmed up and during the warm-up period exhibits poor running behavior. A known possibility for avoiding this disadvantage is the use of exhaust gases for washing or scavenging the disconnected group of cylinders. This prior-art method, however, brings about a new disadvantage because an expensive control mechanism and additional units are necessary. In the control the cylinder switchover according to this invention, no additional expenditures are needed. The two cylinder groups 12 and 13 are alternately disconnected and hence an excessive cooling down is avoided. An additional advantage resulting from this alternating disconnection is the fact that the two cylinder groups wear off uniformly.

A problem-free exchange of the disconnected cylinder group is made possible for example after each reconnecting process $S_{63}$ according to the following order:

minute load, three-cylinder operational mode with one of the cylinder groups 12 or 13 disconnected;

high load, six-cylinder operational mode, both groups 12 and 13 of cylinders connected;

minute load, three-cylinder operational mode, the other of the two groups 13 and 12 being disconnected.

This order can be readily employed in the case of frequent changes of load and with corresponding frequent alteration from the three-cylinder to six-cylinder operational mode and vice versa. This order ensures that no stronger jerk or an impaired exhaust gas or fuel consumption quality will occur.

After a prolonged three-cylinder mode of operation, that means at a low load and infrequent load changes, however, the switchover will become recognizable by more pronounced jerks. In addition, in the case of very frequent switchovers, the exhaust gas values would impair. As will be explained below, the invention provides an additional step which avoids this disadvantage.

According to this invention, there are introduced three switching conditions, which are partially interdependent:

the switchover from one cylinder group to another cylinder group takes place at a load change;

the switchover does not occur before the running off of a predetermined first number of revolutions of the engine;

the switchover takes place latest then when a predetermined second, larger number of engine revolutions is present.

Due to the first-mentioned exchange condition, the changeover of the cylinder groups with the light jerk takes place only then when a torque change is desired. As a consequence, the shock or jerk is no longer detectable. In order to avoid too frequent changing of the mode of operation, a certain number of enginge rotations is reserved after a completed switching process, before the next changeover is permitted. It has been proved that a number of about 500–1,000 rotations is suitable for this purpose. The completion of a predetermined number of rotations of the engine is easier to monitor than a predetermined time interval. In addition, the number of pumping steps which is proportional to the number of revolutions determines approximately the cooling effect of the disconnected group of cylinders. Finally, a control by means of a revolution counter is simpler to realize. In FIG. 2, the corresponding building parts are the rotary speed sensor 47, the counter 45 and a changeover device 44.

The behavior at idling operation is another characteristic parameter of an internal combustion engine. In the three-cylinder mode of operation, the idling operational quality of an internal combustion engine is normally more disadvantageous than in the six-cylinder mode of operation. It is true that an idling speed regulator which controls via an adjusting member the air flow for the idling operation in the three-cylinder mode can take care for a constant idling speed; nevertheless such measure requires a considerable expenditure, such as for auxiliary units and control devices. By contrast, in the cylinder disconnecting system according to this invention the stabilization of the idling rotary speed is made possible without any additional units by employing software program measures only. The corresponding circuits in the diagram of FIG. 2 for stabilizing the idling rotary speed are the idling operation adjusting device 56 and the idling speed switching device 57 in the circuit group 53.

Figure 10:
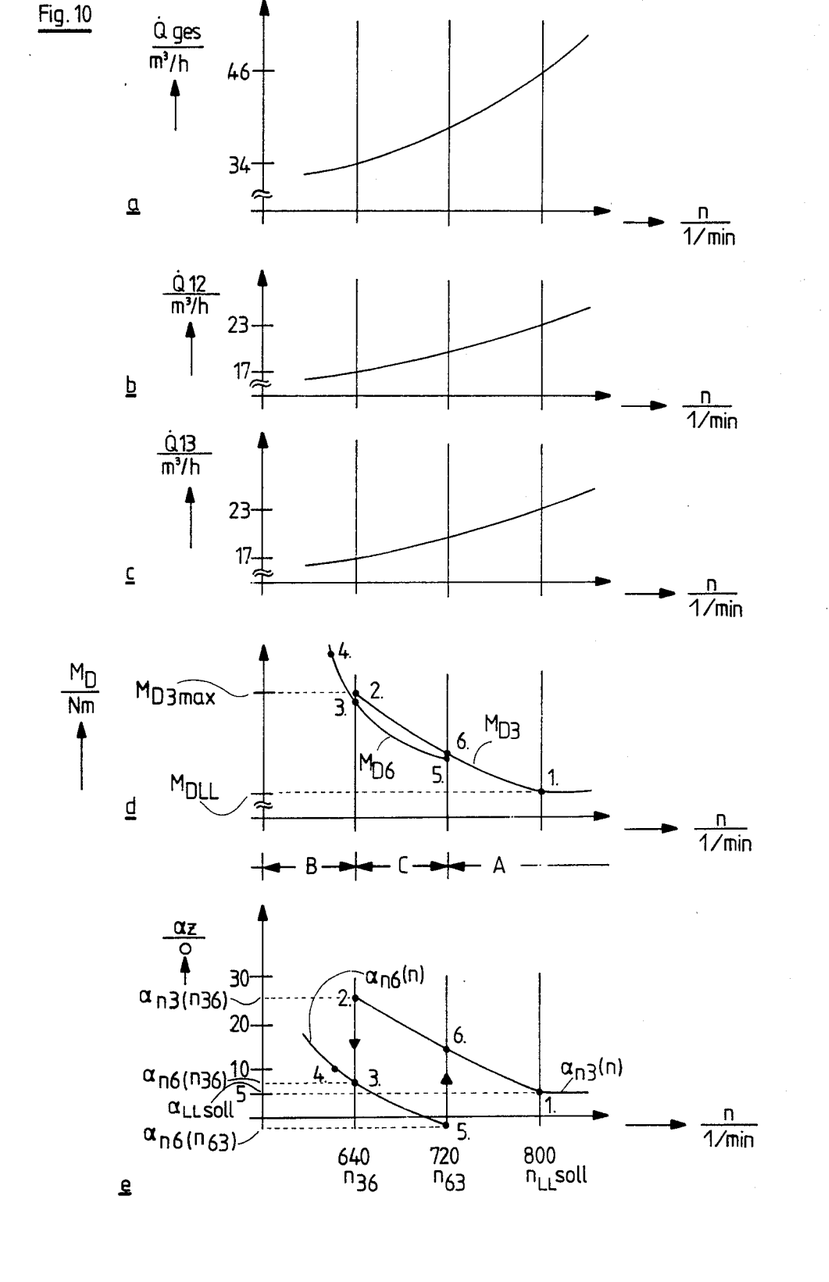
FIGS. 10a–10e illustrate plot diagrams of idling speed stabilization versus the rotary speed of the engine.
Figure 11:
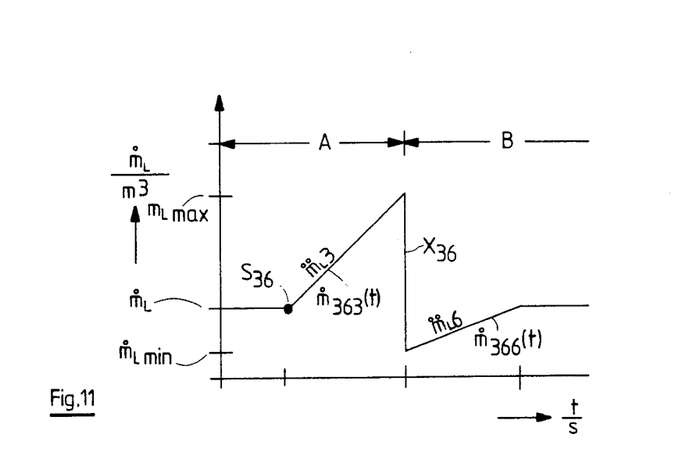
FIG. 11 is a time plot of the regulation of the auxiliary air during the connection of a further group of cylinders.

In FIG. 10, the plot diagrams are illustrate how the stabilization of rotary speed of the engine is achieved for one of the cylinder groups in response to the rotary speed of 800 rotations per minute and a corresponding idling speed air flow of 23 cubic meters per hour. Thereafter, a three-cylinder mode of operation takes place.

In this simplest version, the device 24 for auxiliary air represented in FIG. 1 as a bypass conduit bridging the throttling valve is in the form of an auxiliary air slider. That means that the idling rotary speed is not stabilized by the air charge regulation from the control device. The second group is co-running without charge. The air flow measured by the air flow meter 23 is thus twice as large as the amount of air needed by the operative three-cylinder group. The course of the total amount of air flow is illustrated in FIG. 10a, and respective pairs of the two cylinder groups are illustrated in FIGS. 10b and 10c.

If the rotary speed n drops due to increase of the load of the engine, then the ignition angle $\alpha_{n3}$ is restored to a previous value via a rotary speed characteristic line for the three-cylinder operational mode, the line being programmed by means of the ignition angle generating device 54 in the control device 27. This curve is illustrated in FIG. 10e. It will be seen that the torque $M_D$ is increasing, as indicated in FIG. 10d. Due to the torque increase, a stabilization of the three-cylinder operational mode is achieved.

If the load of the engine keeps increasing and as a consequence the rotary speed drops below a predetermined value $n_{36}$, then the second cylinder group is switched on and simultaneously the ignition angle is readjusted to a retardation angle $\alpha_{n6}$. This relationship is again shown in FIG. 10e.

When the rotary speed of the machine still more decreases due to a further increase of the load, then the ignition angle $\alpha_{n6}$ is again adjusted in the direction of a prior value. As a result, the torque of the machine as indicated in FIG. 10d is further increased. The stronger is the increase of the torque in comparison to the decrease of the rotary speed, the stronger is the stabilizing effect.

Provided that the engine load starts decreasing, then the rotary speed increases firstly in the six-cylinder operational mode. When the rotary speed exceeds a predetermined value $n_{63}$ which is greater than the above mentioned switchover-rotary speed value $n_{36}$, then the second cylinder group is again disconnected and the ignition angle is simultaneously adjusted to a prior value. During a further decrease of the rotary speed, the ignition angle is continuously shifted in the direction of later values.

In FIGS. 10d and 10e, a range A indicates the three-cylinder mode of operation, the range B a six-cylinder mode of operation, and the range C represents a hysteresis range. In the hysteresis range C, there is either a three-cylinder mode of operation or a six-cylinder mode of operation, depending on whether the engine has reached this range from the higher or from the lower rotary speeds. Due to the hysteresis behavior, a continuous switchover from the three-cylinder to the six-cylinder mode of operation, and vice versa, is avoided. In connecting the second cylinder group, a substantially stronger stabilizing effect is obtained than in the case of conventional negative characteristic line of the ignition angle in the six-cylinder operational mode.

The before mentioned fact that the air flow measured by the metering device 23 in the three-cylinder mode of operation is twice as large as the corresponding air flow in conventional six-cylinder operation, brings about an additional advantage, inasmuch as the control device 27 operates with greater accuracy than the prior-art control devices for the engine. Moreover, the transition resistances in the conduits to the air flow meter 23 become less effective.

The warming up of the engine should take place in principle during the six-cylinder operation. To keep the idling speed in the desired range, that means to let it rise to high values, the ignition angle is set to retardation (late values). Above a predetermined threshold value the six-cylinder operation is switched over to three-cylinder operation by an engine temperature signal determined by means of the temperature measuring device 38 and simultaneously the ignition angle is adjusted to advance or to a prior value. When the engine temperature reaches its nominal value, the ignition angle is adjusted to values indicated in the plot of FIG. 10e.

In addition to or instead of the above described idling speed stabilization through the adjustment of the ignition angle, there is possible in the internal combustion engine of this invention to regulate the idling operation via the auxiliary air device 24 and the idling speed adjuster 25. The latter regulation is called the air charge or volumetric regulation. Because of the earlier or prior ignition angle the warming up of the machine takes place at a better efficiency. In a warmed-up engine a better idling operation stability at advantageous exhaust value is achieved. Particularly advantageous operational conditions of the engine occur when the idling speed stabilization by means of the ignition angle is applied in addition to the idling speed regulation performed by means of the air charge or volumetric value control below the nominal idling speed value.

The volumetric control by controlling the auxiliary air by means of the device 24 can be used with advantage in the internal combustion engine of this invention both for the switch-over from the three-cylinder to the six-cylinder operational mode and vice versa. The auxiliary air is suitably controlled at the moment of the switchover, whereupon the ignition angle is regulated. With these measures, a further improvement of the switching process is achieved, since the switching jerks or shocks are further reduced, and the switching process is extended in time. In addition, the effectiveness and the exhaust gas behavior can be further improved, as will be explained in detail below.

In a switching on of the second cylinder group after the occurrence of the switching signal $S_{36}$, a small amount $\dot{m}_L$ of auxiliary air flow derived at a partial load is first gradually regulated according to a predetermined time function $\dot{m}_{L3}$ to a maximum value $\dot{m}_{Lmax}$. This process is graphically illustrated in FIG. 11. When this maximum value is reached, then at the time point $X_{36}$ the second cylinder group is switched on, and simultaneously the auxiliary air flow is suddenly reduced to a minimum value $\dot{m}_{Lmin}$. Subsequently, it is again regulated according to a new time function $\dot{m}_{L6}$ to value $\dot{m}_L$ of the auxiliary air flow.

Figure 12:
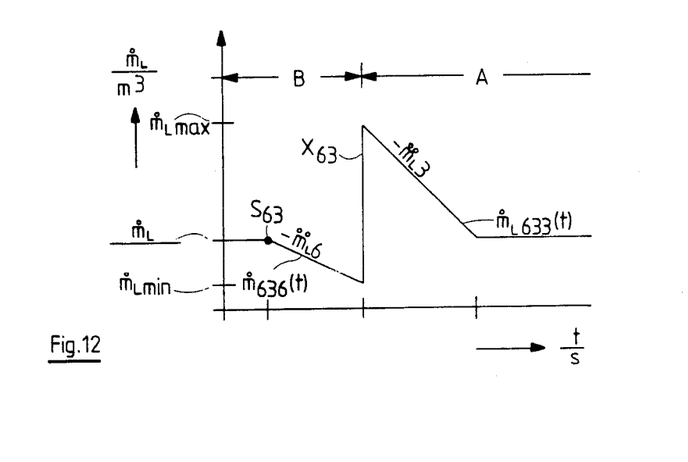
FIG. 12 is a time plot of the regulation during the disconnection of an active group of cylinders.

FIG. 12 shows graphically the switchover from a six-cylinder operational mode to a three-cylinder operational mode. This switching process is similar to the switchover from the three-cylinder to the six-cylinder operational mode, except that it is performed in reversed order. After the occurrence of the switchover signal $S_{63}$, the value $\dot{m}_L$ of the auxiliary air flow is regulated, starting from the partial load to the minimum value $\dot{m}_{Lmin}$; during the switchover, at the time point $X_{63}$, the flow of auxiliary air is suddenly increased to a maximum value $\dot{m}_{Lmax}$ and subsequently gradually regulated to the partial load-auxiliary air flow value $\dot{m}_L$.

It is also feasible that the control of the auxiliary air flow is made such that, in the three-cylinder operational mode with open throttling valve (the switch for idling operation is not closed), the auxiliary air device 24 remains open for maximum flow and, in the six-cylinder operational mode, is set to its minimum opening. In this manner the up and down regulating functions for the stationary operation can be dispensed with, and only the switchover process takes place.

The volumetric efficiency control in the control circuit of FIG. 2 is performed substantially by three circuits, namely by the control signal generator 58, the function generator 59 and the idling speed adjuster 25, cooperating with the auxiliary air flow device 24. For activating the idling speed adjuster 25 there is employed in conventional manner a train of rectangular pulses produced in the generator 58 with a pulse repetition rate $\tau$. The function generator 59 then delivers control values indicated in FIGS. 11 and 12 for achieving the corresponding change of the pulse rate $\tau$ and hence the value $\dot{m}_L$ of the auxiliary air flow during the cylinder switchover. At the normal function of the volumetric efficiency regulation during idling operation, there are of course generated different pulse repetition rates $\tau$ corresponding to the different requirements for the air flow.

In this embodiment of an example of the internal combustion engine according to this invention, there is employed a gasoline injection system. Nevertheless, this invention in principle is suitable also for application in carburetor-type engines, provided that the control device for the engine also includes means for disconnecting fuel supply for a cylinder group.

In this embodiment there is used the air flow signal $t_L$ as the load signal; in a modification, there can be also employed other load signals $t_L$, for example signals derived from the underpressure or from the angular position of the throttling valve.

It will be understood that each of the elements described above, or two or more together, may also find a useful application in other types of constructions differing from the types described above.

While the invention has been illustrated and described as embodied in a specific example of a multi-cylinder internal combustion engine equipped with disconnectable groups of cylinders, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A multi-cylinder internal combustion engine, particularly for use in motor vehicles, having its cylinders divided into a plurality of groups each including at least one cylinder, at least one of said groups being disconnectable in dependence on the occurrence of at least one operational parameter of the engine, comprising an electrically controlled disconnecting means for disconnecting said one group, monitoring means for monitoring the operational parameters of the engine, control means controlled by said monitoring means to activate said disconnecting device when a predetermined value of the operational parameter is detected, said monitoring means including a device for measuring the engine load and a device for measuring the rotary speed of the engine, said control means including an ignition angle adjusting device and a fuel metering device, means for generating a threshold value depending on the measured engine load and the rotary speed, said threshold value generating means being coupled to said disconnecting means so as to inactivate the same when the threshold value is exceeded, a second means for generating a second threshold depending on the engine load and the rotary speed of the engine, the second threshold being larger than the first-mentioned threshold and being coupled to said disconnecting means so as to disconnect at least one of the cylinder groups in dependence on the second threshold value, and further comprising means for enriching the fuel mixture by a correction factor and means for exchanging the ignition angle prior to the changeover of the cylinder groups so that within a predetermined time interval a maximum torque of the engine is generated.

2. An internal combustion engine as defined in claim 1, wherein said engine load measuring device is an air flow meter.

3. An internal combustion engine as defined in claim 1, wherein said monitoring means includes a counter connected to said rotary speed measuring device for counting revolutions of the engine and for producing after a predetermined number of revolutions an output signal applied to said selection control means for activating the latter.

4. An internal combustion engine as defined in claim 3, wherein said monitoring means further includes a threshold value interrogating device connected to said engine load measuring device for determining whether the engine load is below or above a predetermined threshold value.

5. An internal combustion engine as defined in claim 4, further including a load difference forming device connected between said engine load measuring device and said switchover means to produce a difference signal between two consecutive load signals.

6. An internal combustion engine as defined in claim 5, further comprising an acceleration interrogator connected between said difference forming device and said switch-over means, said acceleration interrogator having a threshold characteristic for determining both the difference in the engine load and in the rotary speed.

7. An internal combustion engine as defined in claim 6, further comprising a signal blocking device connected between said threshold value interrogating device and said acceleration interrogating device and said disconnecting means for protecting the latter against interfering signals.

8. An internal combustion engine as defined in claim 7, wherein said fuel metering device has an input connected to said engine load metering device and an output connected to said switchover means, and a factor generating device having an output connected to another input of said fuel metering device.

9. An internal combustion engine as defined in claim 8, further comprising ignition control means, an ignition angle adjusting device for generating a regulating function for a time-dependent ignition angle, the latter device having an input connected to the engine load measuring device and another input connected to said rotary speed measuring device, an output coupled to said signal blocking device and another output connected to said ignition control means.

10. An internal combustion engine as defined in claim 8, wherein the inputs of said factor generator device are connected to the outputs of said signal blocking device.

11. An internal combustion engine as defined in claim 1, further comprising an idling speed adjuster, a control signal generator for said speed adjuster, a function generator connected between said control signal generator and said idling speed adjuster, and a device for recognizing the end of speed regulating function, said device for recognizing having an input connected to said factor forming device, another input connected to an output of said function generator, and still another input connected to said ignition angle adjuster, and an output connected to an input of said signal blocking device.

12. An internal combustion engine as defined in claim 11, further comprising an idling speed stabilizing device connected between said rotary speed measuring device and said ignition control means, and an idling speed switching device connected between said rotary speed measuring device and said switchover means.

13. An internal combustion engine as defined in claim 12, further comprising a temperature measuring device for measuring the engine temperature, said temperature measuring device being connected to an input of said idling speed switching device.

14. An internal combustion engine as defined in claim 13, further comprising means for controlling volumetric efficiency between the idling speed adjuster and the control signal generator, said means including the function generator for adjusting the idling speed.

15. An internal combustion engine as defined in claim 14, wherein said function generator has an output connected to said recognition device.

16. An internal combustion engine as defined in claim 1, comprising air intake means having a single throttling valve.

17. An internal combustion engine as defined in claim 16, comprising a single air flow meter arranged upstream of said throttling valve.

18. A multi-cylinder internal combustion engine, particularly for use in motor vehicles, having its cylinders divided into a plurality of groups each including at least one cylinder, at least one of said groups being disconnectable in dependence on the occurrence of at least one operational parameter of the engine, comprising an electrically controlled disconnecting means for disconnecting said one group, monitoring means for monitoring the operational parameters of the engine, control means controlled by said monitoring means to activate said disconnecting device when a predetermined value of the operational parameter is detected, said monitoring means including a device for measuring the engine load and a device for measuring the rotary speed of the engine, said control means including an ignition angle adjusting device and a fuel metering device means for generating a threshold value depending on the measured engine load and the rotary speed, said threshold value generating means being coupled to said disconnecting means so as to inactivate the same when the threshold value is exceeded, a second means for generating a second threshold depending on the engine load and the rotary speed of the engine, the second threshold being larger than the first-mentioned threshold and being coupled to said disconnecting means so as to disconnect at least one of the cylinder groups in dependence on the second threshold value, and wherein prior to the changeover of the cylinder group, depending on the engine load and the rotary speed, a factor for rendering the fuel mixture lean and a factor for retarding the ignition angle are generated and changed in such a manner that within a predetermined time interval a minimum torque of the engine is generated.

19. An internal combustion engine as defined in claim 18, comprising a full-load switch and means for connecting during a stionary operation of the engine all cylinders in operation independently on operational parameters of the engine when the full-load switch is closed.

20. An internal combustion engine as defined in claim 19, further including an idling operation switch connected to said disconnecting means for disconnecting at least one cylinder group during the stationary operation of the engine independently on operational parameters when the idling operation switch is closed.

21. An internal combustion engine as defined in claim 20, further including an idling speed adjuster and means for stabilizing the idling operation of the engine, said idling speed adjuster cooperating with means for controlling the flow of auxiliary air in the engine.

* * * * *